Sept. 25, 1934. H. A. GEHRES 1,974,740
FLUID OPERATED FRICTION CLUTCH
Filed Feb. 18, 1933
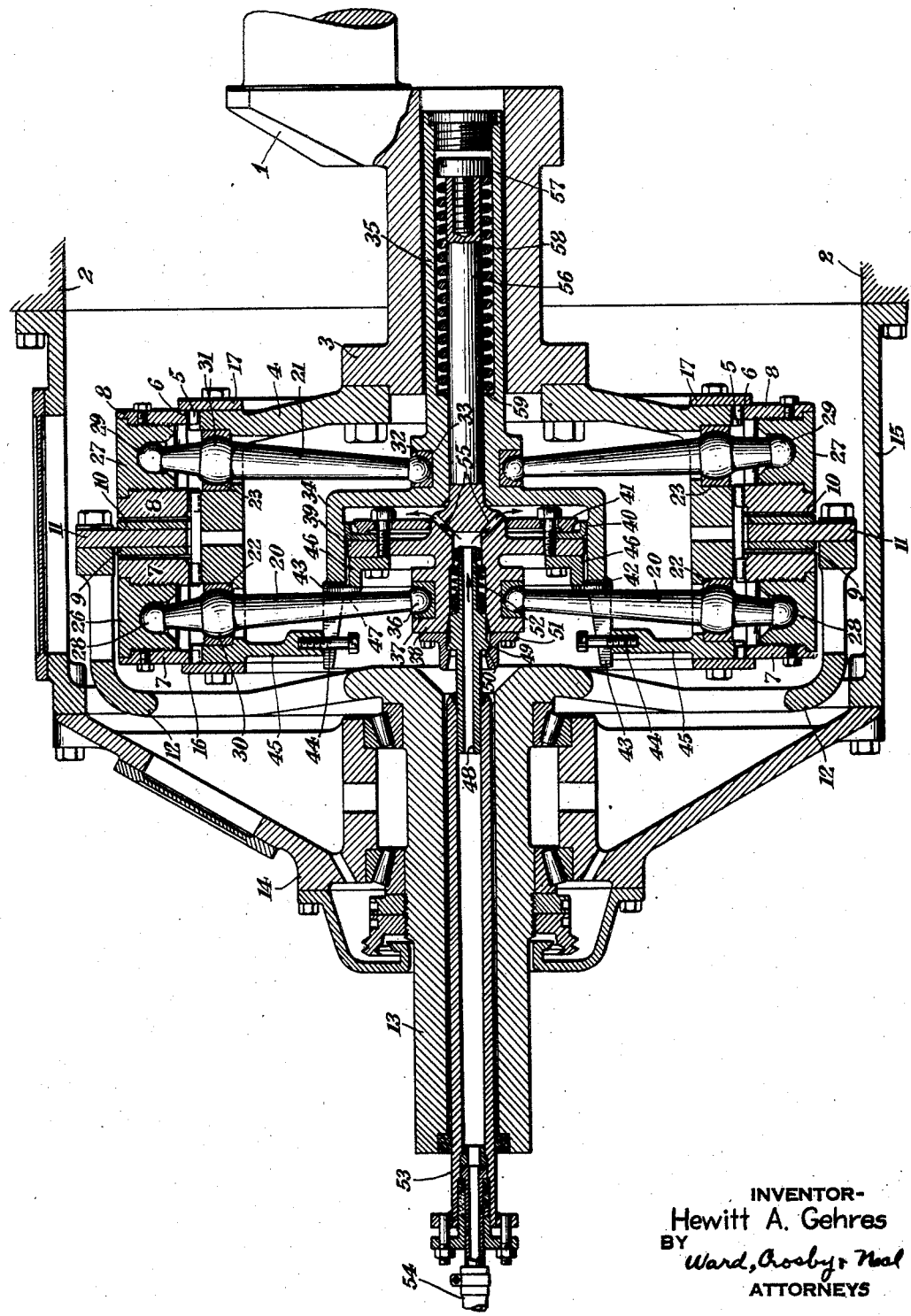
INVENTOR-
Hewitt A. Gehres
BY
Ward, Crosby & Neal
ATTORNEYS Patented Sept. 25, 1934

1,974,740

UNITED STATES PATENT OFFICE 1,974,740

FLUID OPERATED FRICTION CLUTCH

Hewitt A. Gehres, Mount Vernon, Ohio, assignor to Cooper-Bessemer Corporation, Mount Vernon, Ohio, a corporation of Ohio Application February 18, 1933, Serial No. 657,329

9 Claims. (Cl. 192—85)

This invention relates to improved fluid operated clutches.

One of the objects of this invention is the provision of improved fluid clutch operating means comprising parts so related and supported as to provide for a floating construction in which there is no end thrust to be taken up by bearings or the like, and which parts are automatically adjustable to avoid the necessity of making any changes in adjustment therein to compensate for wear on the friction surfaces or faces of the cooperating clutch elements.

Other objects of the invention consist in advantages and features which will appear from the following description taken in connection with the single figure of the drawing, which shows a longitudinal diametral section through the clutch and associated mechanism.

For the purpose of disclosing the principles of my invention I have shown a single one-way clutch operated by levers of substantially the same construction as those employed for operating the reversible clutch shown in the patent to Gehres et al. 1,887,635, November 15, 1932. In said patent the operating mechanism is located within the drive shaft and comprises mechanical elements. In accordance with the present invention a fully floating fluid operated means is provided for operating levers of the type disclosed in said patent, which mechanism is located within the flywheel and the driving shaft and the driven shaft.

In the drawing I have illustrated a crank shaft 1 which may be supported in the usual manner by means, not shown, in an engine housing 2 and which may be provided with a circumferential end flange 3 to which may be secured a flywheel 4 which may be of the general construction disclosed. The outer surface of the flywheel may be provided with transversely extending ribs 5 which cooperate with transversely extending ribs 6 on clutch rings 7 and 8 for driving said rings, said ribs providing for sliding movement of said rings transversely of the flywheel for movement into and out of cooperation with friction face plates 9 and 10 on a clutch disk 11 which may be supported on a driven disk 12 integral with or secured to a driven shaft 13 on which a driven member, such as a pulley or sprocket wheel or the like, not shown, may be supported. The driven shaft 13 may be supported by any suitable bearings in a member 14 which may be secured to or integral with a cylindrical clutch housing 15 which may be secured to the engine frame 2 by any suitable means. The member driven by the shaft 13 is located to the left of the housing.

As shown in the drawing, the sliding clutch rings 7 and 8 may be moved against the friction face plates of the clutch disk 11 to transmit movement from the crank shaft 1 and the flywheel 4, to the clutch disk 11 and driven shaft 13. The movement of these members away from each other is preferably limited by rings 16 and 17 secured to the outside faces of the flywheel 4 by any suitable means.

The clutch rings 7 and 8 are moved toward and away from each other preferably by means of levers 20 and 21. These levers may be fulcrumed in suitable bearing blocks 22 and 23 seated in recesses in the flywheel 4. Members 26 and 27 threaded into the clutch rings 7 and 8 are provided with semi-spherical seats for the semi-spherical outer ends 28 and 29 of the levers 20 and 21. The socket members 26 and 27 may be locked in adjusted position by screw bolts, as indicated. The fulcrum portions of the levers 20 and 21 are preferably spherical as indicated at 30 and 31. Any suitable number of levers 20 and 21 may be employed.

The inner ends of the levers 21 are preferably ball-shaped, as indicated at 32, which cooperate with semi-spherical seats in blocks 33 in a fluid cylinder 34. This fluid cylinder is preferably provided with an extension 35 which operates freely within a cylindrical bore in the end portion of the crank shaft 1, as shown.

The inner ends of the levers 20 are preferably provided with ball-shaped ends 36 which bear in semi-spherical seats in blocks 37 secured in a hub 38 on a piston 39 operating within the cylinder 34. The piston 39 carries a suitable flexible washer 40 which may be held on the piston by means of a ring 41 secured thereto by screw bolts, as indicated.

For the purpose of causing the piston and cylinder to rotate with the flywheel, the cylindrical portion of the cylinder 34 is preferably extended, as indicated at 42, the extended portion being slotted as indicated at 43, within which the levers 20 operate and with which cooperate screw bolts 44, screwed into an inwardly extending flange 45 on the flywheel 4. By means of this construction the cylinder 34 is caused to travel with the flywheel 4. The piston 39 may carry a ring 46 preferably detachably secured thereto and which is provided with radially extending fingers 47 lying within the slots 43 in the extension 42 of the cylinder 34 by means of which the piston 39 is also caused to move with the flywheel 4.

The hub 38 of the piston 39 is preferably provided with a cylindrical bore in which may be housed a sleeve 48 forming a part of the fluid conduit admitting air into the cylinder on the forward side of the piston. The sleeve 48 is retained in the piston by means of a flange 49 on the sleeve and a shoulder 50 on a member 51 secured to the hub 38 of the piston 39. A spring 52 seated on a shoulder on the sleeve 48 presses a sealing ring against a shoulder on said sleeve 48 to seal the joint between the sleeve and piston during rotation and axial movement of the piston with respect to the sleeve. The sleeve 48 may be mounted immovably within a sleeve 53 which extends through a longitudinal bore in the driven shaft 13 and to which a rubber hose connection 54 may be connected by any suitable connection, such as illustrated in the drawing. The sleeve 53 may be held against rotation by any suitable means.

Compressed air, oil or other fluid from any suitable source may be forced under control of any suitable valve through the rubber tubing 54. The air forced into the bore of the hub 38 of the piston 39 passes through ports 55 into the cylinder 34, causing the piston and cylinder to move in opposite directions to move the levers 21 counterclockwise, and the levers 20 clockwise, thereby causing the slidable clutch rings 7 and 8 to engage the friction face plates on the driven clutch disk 11, thus causing the shaft 13 to be driven from the crank shaft 1.

For the purpose of holding the sliding clutch rings 7 and 8 normally at their outer limits of movement in the position shown in the drawing, the hub 38 of the piston 39 may be provided with a cylindrical extension 56 which may extend into a cylindrical opening in the extension 35 of the cylinder 34, and which may be provided with a threaded bolt 57 constituting a seat for one end of a spring 58, the other end of which may bear against a shoulder 59 on the extension 35 of the cylinder 34. The spring is normally under compression to move the clutch rings 7 and 8 into the position shown in the drawing. Any suitable means may be provided to bleed the cylinder 34 in order that the spring 58 may function to disengage the clutch rings 7 and 8 from the clutch disk 11.

By means of the construction shown assurance is had that the sliding clutch rings 7 and 8 are pressed against the clutch disk 11 with equal force in all cases regardless of the original spaces between these rings and the clutch disk 11, and regardless of the amount and unevenness of wear of the friction face plates 9 and 10 on the clutch disk 11. As the pressure is even there is no tendency to move the clutch disk 11 in either direction from its normal position as the sliding clutch rings 7 and 8 are engaged with said clutch disk. As the piston and cylinder are mounted so as to be fully floating there is no end thrust to be taken up and the piston and cylinder may move unequal distances from their normal position to effect equal pressures between the sliding clutch rings 7 and 8 and the clutch disk 11. The piston and cylinder and other parts will accommodate themselves to any wear of the clutch elements.

While I have shown a single embodiment to illustrate the principles of my invention, it is obvious that my invention may be carried out by other embodiments, and therefore the claims are to be construed as covering all equivalents of my invention.

What I claim is:

1. The combination of a drive shaft, a hollow drum-like flywheel secured to said shaft, oppositely movable clutch rings surrounding said flywheel, means providing for rotational movement of said rings with said flywheel and for sliding movement laterally on said flywheel, a driven clutch disk located between said clutch rings, a driven shaft, means for supporting said driven clutch disk on said shaft, means located within said flywheel for operating said clutch rings, and means located within said driven shaft providing means for applying an operating force to said clutch ring operating mechanism.

2. The combination with a drive shaft, a drum-like flywheel carried thereby, a pair of clutch rings surrounding said flywheel, means for communicating rotational movement from said flywheel to said clutch rings and providing for lateral movement of said clutch rings on said flywheel, a driven clutch disk located between said clutch rings, operating levers extending through and mounted in bearings in said flywheel and having their outer ends bearing in said clutch rings and their inner ends projecting toward the center of said flywheel, and means located within the contour and at the axis of said flywheel constituting bearings for the inner ends of said levers and mounted for movement in opposite directions to move said clutch rings into and out of operative engagement with said driven clutch disk.

3. The combination with a drive shaft, a drum-like flywheel carried thereby, a pair of clutch rings surrounding said flywheel, means for communicating rotational movement from said flywheel to said clutch rings and providing for lateral movement of said clutch rings on said flywheel, a driven clutch disk located between said clutch rings, operating levers mounted in said flywheel and having their outer ends bearing in said clutch rings and their inner ends projecting toward the center of said flywheel, means located within said flywheel constituting bearings for the inner ends of said levers and mounted for movement in opposite directions to move said clutch rings into and out of operative engagement with said driven clutch disk, said means comprising a cylinder in which the inner ends of the levers cooperating with one of said clutch rings are seated and a cooperative piston within which the inner ends of the levers cooperating with the other clutch ring are seated, and means for admitting fluid under pressure into said cylinder.

4. The combination with a drive shaft, a drum-like flywheel carried thereby, a pair of clutch rings surrounding said flywheel, means for communicating rotational movement from said flywheel to said clutch rings and providing for lateral movement of said clutch rings on said flywheel, a driven clutch disk located between said clutch rings, operating levers mounted in said flywheel and having their outer ends bearing in said clutch rings and their inner ends projecting toward the center of said flywheel, means located within said flywheel constituting bearings for the inner ends of said levers and mounted for movement in opposite directions to move said clutch rings into and out of operative engagement with said driven clutch disk, said means comprising a cylinder in which the inner ends of the levers cooperating with one of said clutch rings are seated and a cooperative piston within which the inner ends of the levers cooperating with the other clutch ring are seated, means for admitting fluid pressure into said cylinder, said cylinder and said piston being provided with concentric extensions, and a restoring spring bearing on said extensions for restoring said clutch rings to normal position.

5. The combination with a drive shaft, a drum-like flywheel carried thereby, a pair of clutch rings surrounding said flywheel, means for communicating rotational movement from said flywheel to said clutch rings and providing for lateral movement of said clutch rings on said flywheel, a driven clutch disk located between said clutch rings, a shaft operatively connected to said driven clutch disk, operating levers mounted in said flywheel and having their outer ends bearing in said clutch rings and their inner ends projecting toward the center of said flywheel, means located within said flywheel constituting bearings for the inner ends of said levers and mounted for movement in opposite directions to move said clutch rings into and out of operative engagement with said driven clutch disk, said means comprising a cylinder in which the inner ends of the levers cooperating with one of said clutch rings are seated and a cooperative piston within which the inner ends of the levers cooperating with the other clutch ring are seated, means for admitting fluid pressure into said cylinder, concentric extensions on said cylinder and piston extending freely within a bore in said crank shaft, a conduit located within the bore of the driven shaft, and a connection between said conduit and said piston providing for sliding and rotational movement of said piston with respect to said conduit, said piston being provided with bores leading from the space receiving said connection to the space in said cylinder.

6. The combination with a drive shaft, a drum-like flywheel carried thereby, a pair of clutch rings surrounding said flywheel, means for communicating rotational movement from said flywheel to said clutch rings and providing for lateral movement of said clutch rings on said flywheel, a driven clutch disk located between said clutch rings, operating levers mounted in said flywheel and having their outer ends bearing in said clutch rings and their inner ends projecting toward the center of said flywheel, means located within said flywheel constituting bearings for the inner ends of said levers and mounted for movement in opposite directions to move said clutch rings into and out of operative engagement with said driven clutch disk, said means comprising a cylinder in which the inner ends of the levers cooperating with one of said clutch rings are seated and a cooperative piston within which the inner ends of the levers cooperating with the other clutch ring are seated, means for admitting fluid pressure into said cylinder, and means for driving said cylinder and piston from said flywheel.

7. In a clutch mechanism, the combination of a pair of clutch rings and a cooperating clutch member, and a wholly floating pneumatic operating device for moving said clutch rings and clutch member axially into cooperative driving engagement.

8. In a clutch mechanism, the combination of a pair of clutch rings and a cooperating clutch member, a wholly floating pneumatic operating device for moving said clutch rings and clutch member into cooperative driving engagement, said device comprising a cylinder and cooperating piston, and operating connections between the cylinder and one of said rings and the piston and the other of said rings.

9. In combination with a driving shaft and a driven shaft arranged in alignment and having their ends spaced apart, of a clutch member fixedly connected to one of said shafts, cooperating clutch means movably mounted with respect to the other of said shafts, and wholly floating operating means located between the ends of said shafts for operating said movable clutch means.

HEWITT A. GEHRES.